(12) United States Patent
Friedland et al.

(10) Patent No.: US 11,574,027 B1
(45) Date of Patent: Feb. 7, 2023

(54) SYSTEMS AND METHODS FOR MANAGING OBFUSCATED CONTENT

(71) Applicant: Meta Platforms, Inc., Menlo Park, CA (US)

(72) Inventors: Jeremy Samuel Friedland, San Francisco, CA (US); Mathias Roth, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 125 days.

(21) Appl. No.: 17/140,917

(22) Filed: Jan. 4, 2021

Related U.S. Application Data

(63) Continuation of application No. 16/022,219, filed on Jun. 28, 2018, now abandoned.

(51) Int. Cl.
*G06F 16/9535* (2019.01)
*G06N 20/00* (2019.01)
*G06Q 50/00* (2012.01)

(52) U.S. Cl.
CPC ......... *G06F 16/9535* (2019.01); *G06N 20/00* (2019.01); *G06Q 50/01* (2013.01)

(58) Field of Classification Search
None
See application file for complete search history.

(56) References Cited

U.S. PATENT DOCUMENTS

| | | | |
|---|---|---|---|
| 2010/0064053 A1* | 3/2010 | Bull | H04N 21/4722 709/231 |
| 2013/0024788 A1 | 1/2013 | Olsen et al. | |
| 2013/0110978 A1 | 5/2013 | Gordon et al. | |
| 2013/0198652 A1* | 8/2013 | Dunn | G06F 3/0484 715/751 |
| 2013/0332194 A1* | 12/2013 | D'Auria et al. | G16H 10/60 705/3 |
| 2014/0025692 A1 | 1/2014 | Pappas | |
| 2014/0067623 A1* | 3/2014 | Abraham | G06Q 50/01 705/27.1 |
| 2014/0074923 A1* | 3/2014 | Vasudevan | G06F 21/10 709/204 |
| 2014/0279283 A1 | 9/2014 | Budaraju et al. | |
| 2014/0282096 A1* | 9/2014 | Rubinstein | G06F 3/04842 715/753 |
| 2015/0067878 A1* | 3/2015 | Steelberg | G06F 21/10 726/26 |
| 2015/0222375 A1* | 8/2015 | Yamada | H04H 60/80 455/420 |
| 2016/0294781 A1* | 10/2016 | Ninan | H04L 63/0428 |
| 2017/0038933 A1* | 2/2017 | Hoskins | G06F 3/0484 |
| 2017/0048245 A1* | 2/2017 | Owen | G06F 21/6227 |
| 2018/0241552 A1* | 8/2018 | Kurian | H04L 9/0852 |
| 2018/0255368 A1 | 9/2018 | Kasi | |

\* cited by examiner

*Primary Examiner* — William J. Goodchild
(74) *Attorney, Agent, or Firm* — Sheppard Mullin Richter & Hampton LLP

(57) ABSTRACT

Systems, methods, and non-transitory computer-readable media can determine a content item being posted to a social networking system. A selection of an option to obfuscate at least one portion of the content item can be determined. The at least one portion of the content item can be obfuscated.

20 Claims, 16 Drawing Sheets

500

Provide a content feed comprising content items associated with a plurality of entities to be presented through a display screen of a computing device
502

Determine a selection of an option to temporarily prevent content items satisfying at least one criterion from appearing in the content feed for a duration of time
504

Remove at least one content item that satisfies the at least one criterion from the content feed
506

FIGURE 5A

SYSTEMS AND METHODS FOR MANAGING OBFUSCATED CONTENT

CROSS-REFERENCE TO RELATED APPLICATIONS

This application is a continuation of U.S. patent application Ser. No. 16/022,219, filed on Jun. 28, 2018 and entitled "SYSTEMS AND METHODS FOR MANAGING OBFUSCATED CONTENT", which is incorporated in its entirety herein by reference.

FIELD OF THE INVENTION

The present technology relates to the field of content management. More particularly, the present technology relates to techniques for providing users with the ability to manage content.

BACKGROUND

Today, people often utilize computing devices (or systems) for a wide variety of purposes. Users can use their computing devices to, for example, interact with one another, access content, share content, and create content. In some cases, media content items can include postings from members of a social network. The postings may include text and media content items, such as images, videos, and audio. The postings may be published to the social network for consumption by others.

SUMMARY

Various embodiments of the present disclosure can include systems, methods, and non-transitory computer readable media configured to provide a content feed comprising content items associated with a plurality of entities to be presented through a display screen of a computing device. A selection of an option to temporarily prevent content items satisfying at least one criterion from appearing in the content feed for a duration of time can be determined. At least one content item that satisfies the at least one criterion can be removed from the content feed.

In some embodiments, the content feed includes content items posted by users, pages, or groups of a social networking system.

In some embodiments, the at least one criterion identifies content items that were posted by a particular user, and wherein content items posted by the particular user are not included in the content feed for the duration of time.

In some embodiments, the at least one criterion identifies content items that were posted to a particular page, and wherein content items posted to the particular page are not included in the content feed for the duration of time.

In some embodiments, the at least one criterion identifies content items that were posted by a particular group or members of the group, and wherein content items posted by the particular group or members of the group are not included in the content feed for the duration of time.

In some embodiments, the at least one criterion specifies one or more topics, and wherein content items associated with the one or more topics are not included in the content feed for the duration of time.

In some embodiments, the at least one criterion specifies one or more keywords, and wherein content items associated with the one or more keywords are not included in the content feed for the duration of time.

In some embodiments, the systems, methods, and non-transitory computer readable media are configured to prevent subsequent content items that satisfy the at least one criterion from being included in the content feed for the duration of time.

In some embodiments, systems, methods, and non-transitory computer readable media are configured to determine a content item being posted to a social networking system; determine a selection of an option to obfuscate at least one portion of the content item; and obfuscate the at least one portion of the content item.

In some embodiments, a user accessing the content item is able to select an option to reveal the at least one obfuscated portion of the content item.

In some embodiments, the user input can be received to report the content item. The content item can be removed from the content feed permanently. The subsequent content items similar to the content item can be prevented from being presented in the content feed. The content item can be reported to the social networking system.

Various embodiments of the present disclosure can include systems, methods, and non-transitory computer readable media configured to determine a content item being posted to a social networking system. A selection of an option to obfuscate at least one portion of the content item can be determined. The at least one portion of the content item can be obfuscated.

In some embodiments, the at least one portion is visually obscured to prevent users of the social networking system from unintentionally viewing the at least one portion of the content item.

In some embodiments, the at least one portion corresponds to text associated with the content item, and wherein the text is visually obscured.

In some embodiments, the at least one portion corresponds to an image associated with the content item, and wherein the image is visually obscured.

In some embodiments, the at least one portion corresponds to at least one frame of a video associated with the content item, and wherein the at least one frame is visually obscured.

In some embodiments, the systems, methods, and non-transitory computer readable media can be configured to determine a selection of an option to include a message with the content item, wherein the message provides a reason for obfuscating the at least one portion of the content item.

In some embodiments, a user accessing the content item is able to select an option to reveal the at least one obfuscated portion of the content item.

In some embodiments, the systems, methods, and non-transitory computer readable media can be configured to determine at least one second portion of the content item to be obfuscated based at least in part on a trained machine learning model and obfuscate the at least one second portion of the content item.

In some embodiments, the systems, methods, and non-transitory computer readable media can be configured to generate a second message to be included with the content item, wherein the second message provides a reason for obfuscating the at least one second portion of the content item.

In some embodiments, the systems, methods, and non-transitory computer readable media can be configured to publish the content item including the at least one obfuscated portion through the social networking system.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5A illustrates an example method, according to an embodiment of the present disclosure.

Figure 1:
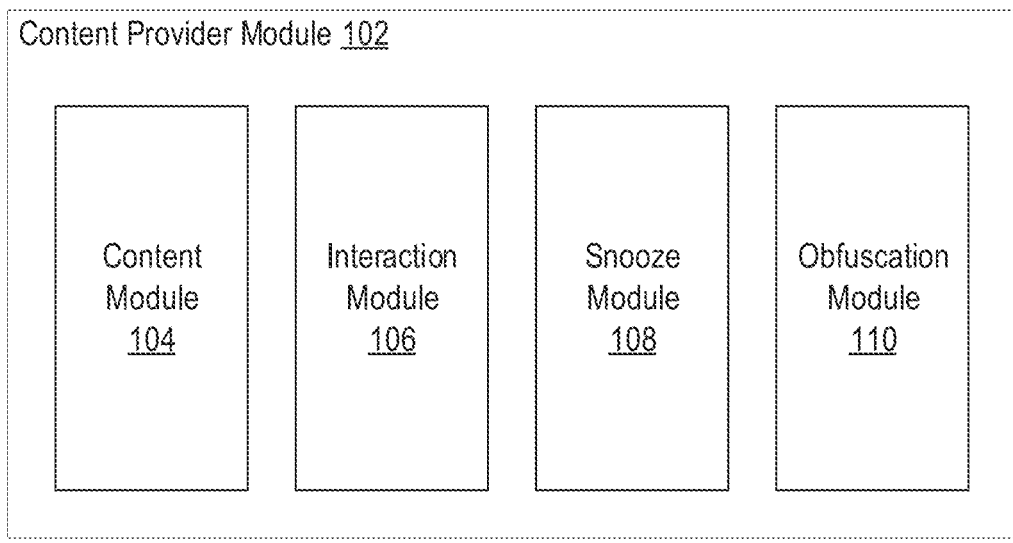
FIG. 1 illustrates an example system including an example content provider module, according to an embodiment of the present disclosure.
Figure 1:
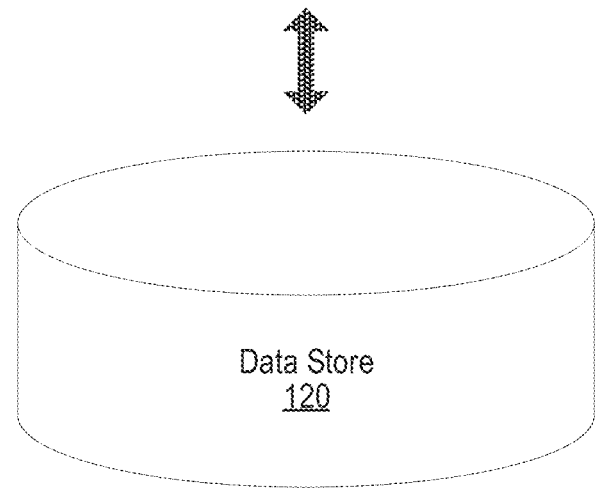

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Content Management

People often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, users may post various content items to the social networking system. Further, some of these posted content items can potentially be included in content feeds of users. For example, each user may have access to a personalized content feed which includes various content items that were deemed to be of interest to the user. Conventional approaches, however, can have limitations that can degrade the overall user experience. For example, conventional approaches typically do not permit users to temporarily prevent certain types of content from appearing in their content feeds. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, a content feed for a given user may include content items posted by a number of entities. In some embodiments, the user can select an option to temporarily prevent certain types of content items from appearing in the user's content feed. For example, in some embodiments, the user can select an option to temporarily prevent content items posted by a specified entity (e.g., user, page, group, etc.) from appearing in the user's content feed. In some embodiments, the user can select an option to temporarily prevent content items that are associated with one or more specified topics (including subjects, themes) and/or terms (or keywords) from appearing in the user's content feed. In some embodiments, users posting content can select an option to conceal (or obscure) some, or all, of the content included in their posts. In such embodiments, a user viewing such posts can select an option to reveal the concealed content.

FIG. 1 illustrates an example system 100 including an example content provider module 102, according to an embodiment of the present disclosure. As shown in the example of FIG. 1, the content provider module 102 can include a content module 104, an interaction module 106, a snooze module 108, and an obfuscation module 110. In some instances, the example system 100 can include at least one data store 120. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6. In some instances, the content provider module 102 can be, in part or in whole, implemented within or configured to operate in conjunction or be integrated with a client computing device, such as the user device 610 of FIG. 6. For example, the content provider module 102 can be implemented as or within a dedicated application (e.g., app), a program, or an applet running on a user computing device or client computing system. The application incorporating or implementing instructions for performing some, or all, functionality of the content provider module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The content provider module 102 can be configured to communicate and/or operate with the at least one data store 120, as shown in the example system 100. The at least one data store 120 can be configured to store and maintain various types of data. For example, the data store 120 can store information describing various content that has been posted by users of a social networking system. In some implementations, the at least one data store 120 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 120 can store information associated with users, such as user identifiers, user information, profile information, user specified settings, content produced or posted by users, and various other types of user data.

The content provider module 102 can be configured to provide users with access to interact with a social networking system. For example, the content module 104 can provide users an interface to post content items to the social networking system. Such content items may include text, images, audio, videos, and live content streams, for example. In some embodiments, the interface can be provided by a software application (e.g., a social networking application, browser, etc.) running on a computing device of a user. The content module 104 can also provide users with access to posted content items. In some embodiments, the content module 104 can automatically identify (or curate) content items to be shown to a given user. For example, the content module 104 can receive content items to be posted and can perform classification analyses to determine topics (or subject matter) reflected by the content items. The classification analyses performed by the content module 104 on content items, such as images or text, can be based on any suitable processing techniques. For example, with respect to images, an image classifier can be trained to determine the subject matter reflected by an image. As another example, with respect to text, topic tagging can use contextual information surrounding a content item to determine topics reflected by the content item. The contextual information can be used to infer topics reflected by the content item. Other suitable techniques to determine topics reflected by content items can be used. For example, tags or hashtags associated with a content item can be used to determine related topics. The content module 104 can select content items for presentation to a user based on interests of the user. In some embodiments, the content module 104 can be implemented as a content feed managed by the social networking system that can select content items (or stories) for presentation to a user. In one embodiment, the content module 104 can train (and retrain) machine learning models for ranking content items for potential presentation in content feeds of users of the social networking system. As just one example, the content module 104 can divide its users into different sets based on various attributes of the users (e.g., age, ethnicity, income, language, etc.) and can generate one or more models for each set of users. Users with different attributes may have different behavioral patterns that can reflect their interests in different topics reflected by content items. As a result, different models for ranking content items for different sets of users can provide more accurate ranking of content items and provide higher likelihood that users will be interested in the topics reflected by the content items presented to them. Features used to train the models can include interactions of users with content items of a content feed. Such interactions can include, for example, selecting a link in the content item, commenting on the content item, liking or otherwise expressing a sentiment reaction in relation to the content item, sharing the content item, hiding the content item, etc. The content module 104 can use the models to determine levels of interest of a user in topics reflected by content items. The social networking system can rank a content item for potential presentation to a user based on a topic(s) reflected by the content item and the level of interest of the user in the topic(s). Content items having a ranking that satisfies a selected threshold value can be presented to the user in his or her content feed. Many variations are possible.

The content provider module 102 can also provide users with options for interacting with individual content items. For example, a user may want to endorse (or "like" or otherwise express a sentiment reaction in relation to) a content item. In such instances, the user can select an option to like the content item. The interaction module 106 can determine when a user likes a given content item and can store information describing this relationship. In some instances, a user may want to post a comment in response to a content item. In such instances, the user can select an option to enter and post the comment for a desired content item. The interaction module 106 can determine when a user posts a comment in response to a given content item and can store information describing this relationship. In some instances, a user may want to share a content item. In such instances, the user can select an option to share the content item, for example, through a content feed. The interaction module 106 can determine when a user shares a given content item and can store information describing this relationship. In some embodiments, such information can be stored in a social graph as described in reference to FIG. 6.

The snooze module 108 can provide options that allow users to temporarily prevent certain types of content items from being included in their respective content feeds. For example, in some embodiments, the snooze module 108 can provide an option for temporarily preventing content items associated with a given entity from being included in a user's content feed. The specified entity may correspond to another user of the social networking system, a page published through the social networking system, or a group (e.g., a group of users having some common interest) accessible through the social networking system, to name some examples. In some embodiments, the snooze module 108 can provide an option for temporarily preventing content items associated with a given topic from being included in a user's content feed. In some embodiments, the snooze module 108 can provide an option for temporarily preventing content items associated with one or more keywords from being included in a user's content feed. More details regarding the snooze module 108 will be provided below with reference to FIG. 2.

The obfuscation module 110 can provide options for visually obscuring (or concealing) content in posts (e.g., text, images, video). For example, the obfuscation module 110 can provide an option that allows a user to visually obscure some, or all, portions of a given content item before the content item is posted and made accessible through the social networking system. A user accessing the content item can select an option to reveal (or unobscure) the obscured portions of the content item. More details regarding the obfuscation module 110 will be provided below with reference to FIG. 3.

Figure 2:
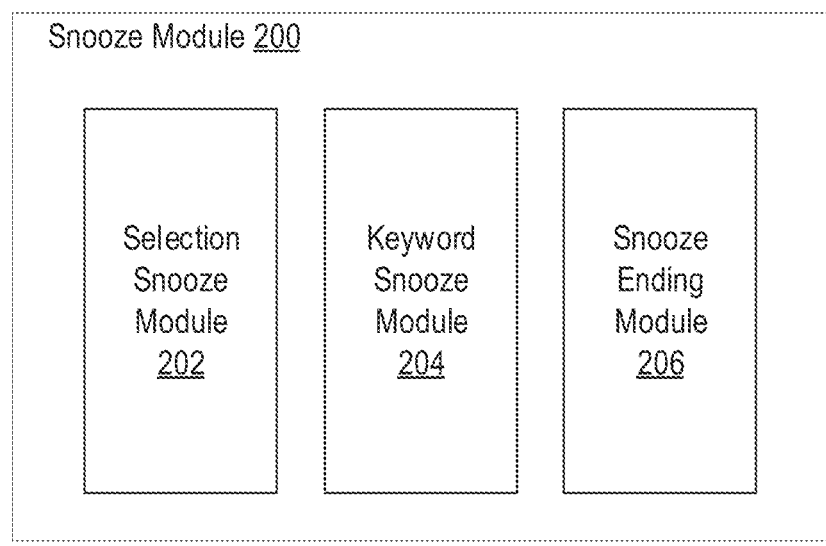
FIG. 2 illustrates an example snooze module, according to an embodiment of the present disclosure.

FIG. 2 illustrates an example snooze module 200, according to an embodiment of the present disclosure. In some embodiments, the snooze module 108 of FIG. 1 can be implemented with the snooze module 200. As shown in the example of FIG. 2, the snooze module 200 can include a selection snooze module 202, a keyword snooze module 204, and a snooze ending module 206.

The selection snooze module 202 can provide options that allow users to temporarily prevent certain types of content items from being included in their respective content feeds. In some embodiments, the selection snooze module 202 can provide an option for temporarily preventing content items associated with a given entity (e.g., a user, a page, a group, etc.) from being included in a user's content feed. For instance, in some embodiments, a user of a social networking system can select this option to prevent content items that were posted by one or more other users of the social networking system from being included in the user's content feed for a specified (or predefined) period of time. For example, a content feed of a first user may include content items posted by a second user. In this example, the first user can select the option to cause the selection snooze module 202 to temporarily prevent content items posted by the second user from being included in the first user's content feed for a specified (or predefined) period of time.

In some embodiments, the selection snooze module 202 can provide an option to prevent content items that were posted to a page from being included in a user's content feed for a specified (or predefined) period of time. For example, a user may like (or subscribe to) a page associated with an entity (e.g., "Bob's Sandwiches") through the social networking system. As a result, the user's content feed may include content items that were originally posted to the page. In this example, the user can select the option to cause the selection snooze module 202 to prevent content items posted to the page from being included in the user's content feed for a specified (or predefined) period of time.

In some embodiments, the selection snooze module 202 can provide an option to prevent content items posted by a group (or by members of the group) from being included in a user's content feed for a specified (or predefined) period of time. For example, a user may like (or be a member of) a group "Avid Hikers" that is accessible through the social networking system. As a result, the user's content feed may include content items that were posted by the group (or by members of the group). In this example, the user can select the option to cause the selection snooze module 202 to prevent content items posted by the group (or by members of the group) from being included in the user's content feed for a specified (or predefined) period of time.

In some embodiments, the keyword snooze module 204 can provide an option for temporarily preventing content items associated with a given topic (or theme) from being included in a user's content feed. In general, content items posted through the social networking system can be associated with one or more topic tags (or theme tags) that describe respective subject matter represented in the content items. Such tags can be used to temporarily prevent certain content items from appearing in content feeds. For example, a user's content feed may include a content item that references a television show (e.g., "Bob's Boba"). The content item may be included with a number of topic tags (e.g., "bob's boba", "boba", "specialty drink", etc.). In this example, the user can select one or more of the topic tags to prevent any content items associated with the selected tags from being included in the user's content feed for a specified (or predefined) period of time. For example, the user can select the "bob's boba" tag to prevent content items associated with the tag "bob's boba" from appearing in the user's content feed. In some embodiments, the keyword snooze module 204 can provide an option for temporarily preventing content items that include one or more keywords from being included in a user's content feed. For example, in some embodiments, a user can select suggested keywords or specify keywords to be used for filtering content from the user's content feed. In this example, content items that include the one or more keywords can temporarily be excluded from the user's content feed for a specified (or predefined) period of time.

In some embodiments, the snooze ending module 206 can notify users when snoozed content items will begin reappearing in their respective content feeds. For example, a user can temporarily prevent (or snooze) certain content items from being included in a user's content feed for a specified (or predefined) period of time. Such content items may include content items that were posted by another user, content items posted to a given page, content items posted in a given group, and content items associated with a particular entity, topic or keyword, to name some examples. In this example, the snooze ending module 206 can notify the user when the specified (or predefined) period of time for temporarily excluding the content items from the user's content feed has expired or is close to expiring. In some embodiments, the snooze ending module 206 can notify the user of an amount of time remaining before the content items begin reappearing in the user's content feed. In some embodiments, the snooze ending module 206 can notify the user of a total number of content items (e.g., posts) that were snoozed or temporarily prevented from being included in the user's content feed. In some embodiments, the snooze ending module 206 can provide the user with an option to re-snooze or temporarily prevent the content items from reappearing in the user's content feed for another specified (or predefined) period of time.

In some embodiments, the snooze module 200 can provide an option for accessing content items that were temporarily excluded from a user's content feed. For example, content items that were temporarily excluded from the content feed for being associated with a particular entity, topic, or keyword can be made available to the user for viewing upon selection of the option by the user. For example, such content items may be made available through the user's content feed or through a different content feed.

Figure 3:
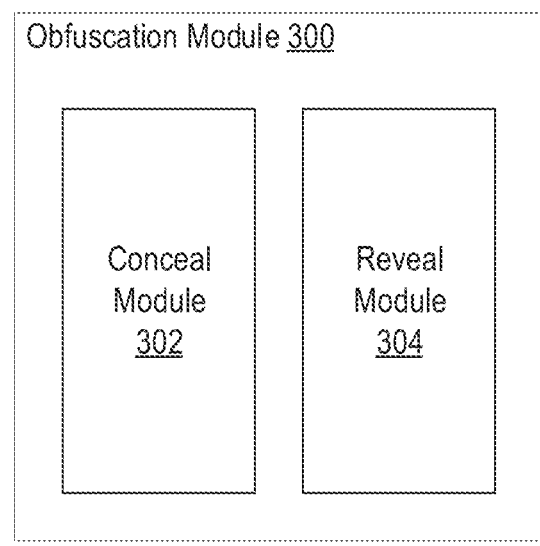
FIG. 3 illustrates an example obfuscation module, according to an embodiment of the present disclosure.

FIG. 3 illustrates an example obfuscation module 300, according to an embodiment of the present disclosure. In some embodiments, the obfuscation module 110 of FIG. 1 can be implemented with the obfuscation module 300. As shown in the example of FIG. 3, the obfuscation module 300 can include a conceal module 302 and a reveal module 304.

The obfuscation module 300 can allow users to visually obfuscate some, or all, portions of content items to be posted through the social networking system. For example, in some embodiments, the conceal module 302 can provide an option to visually obscure (or conceal) some, or all, portions of a given content item prior to posting the content item to the social networking system. In such embodiments, the obscured portions of the content item can be hidden (e.g., blurred) to prevent users from unintentionally viewing those obscured portions. For example, a user may want to post a content item that contains spoilers for a movie. In this example, the user can select an option to visually obfuscate portions of the content item that include the spoilers to prevent other users from unintentionally seeing them. A user viewing the content item can select an option provided by the reveal module 304 to reveal the obfuscated portions if desired. In another example, a user may want to post a content item that contains sensitive media content items (e.g., images, videos, etc.). In this example, the user can select an option to visually obfuscate one or more of the media content items (e.g., images, frame(s) of a video, etc.) to prevent other users from unintentionally viewing them. In some embodiments, when visually obscuring portions of a content item, a user can include a message (or warning) that provides reasons for obscuring the portions to provide notice to other users accessing the content item. Upon accessing the message, the users accessing the content item can then decide whether they want to select an option provided by the reveal module 304 to reveal the obscured portions. If a user selects the option, the reveal module 304 can reveal the obscured portions, which permits the user to view the previously obscured portions. In some embodiments, portions of content items can be obfuscated automatically. For example, in some embodiments, the obfuscation module 300 can utilize a machine learning model to automatically identify portions of content items (e.g., text portions, image portions) that contain or reference sensitive content. The obfuscation module 300 can then obfuscate the identified portions automatically. In some embodiments, the obfuscation module 300 can automatically generate descriptions for obfuscated portions, for example, using generally known techniques.

Figure 4A:
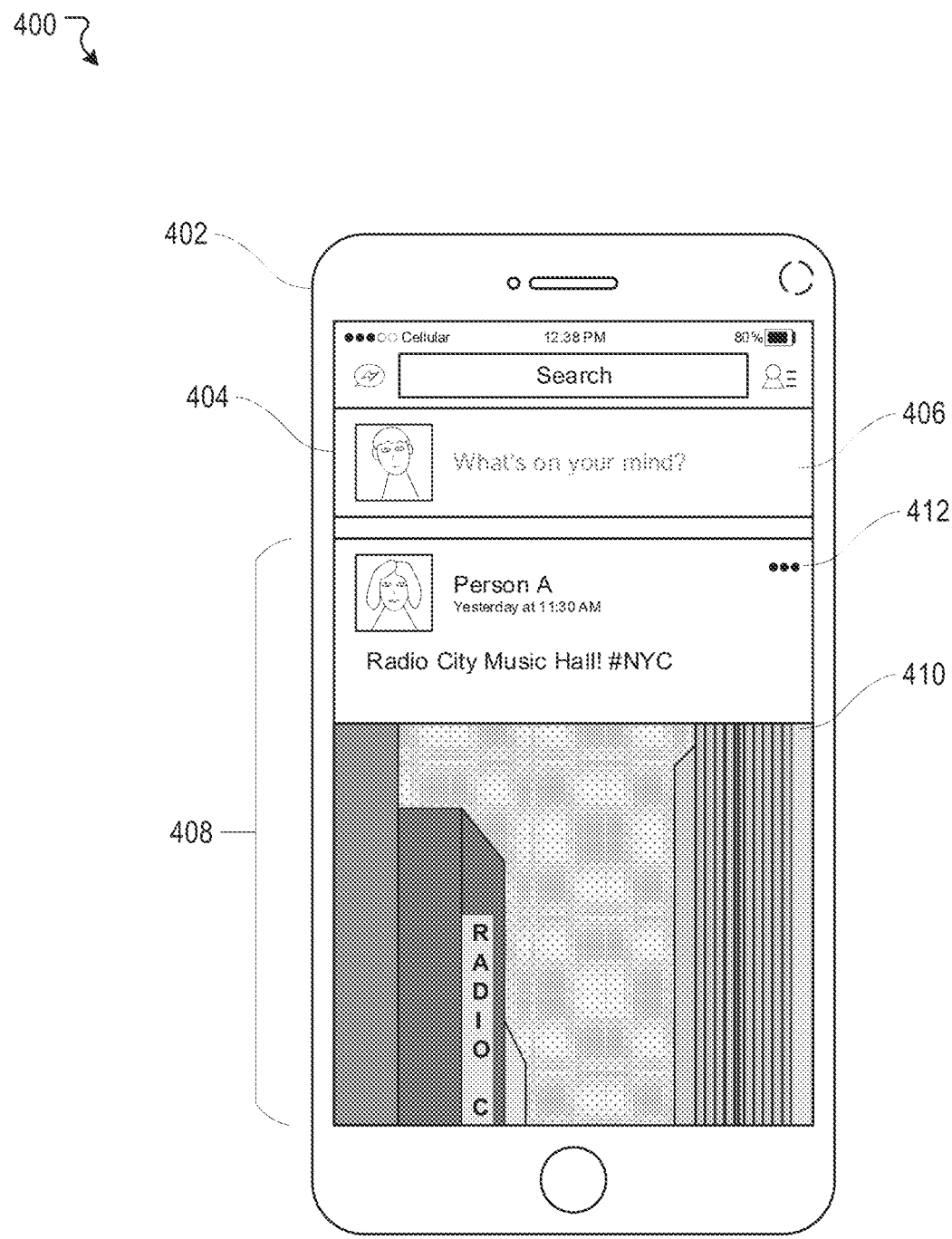
FIGS. 4A-4I illustrate example scenarios, according to an embodiment of the present disclosure.
Figure 4B:
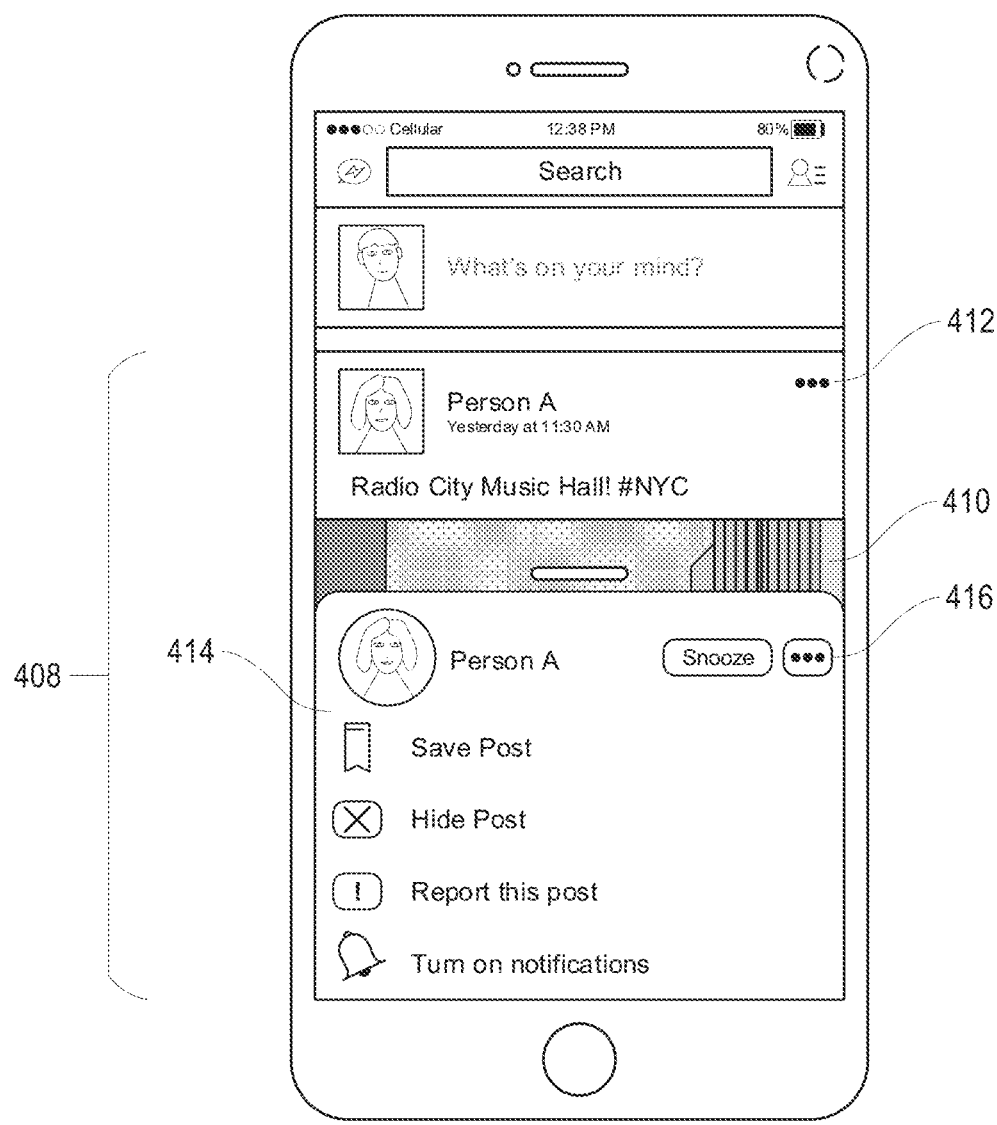
Figure 4C:
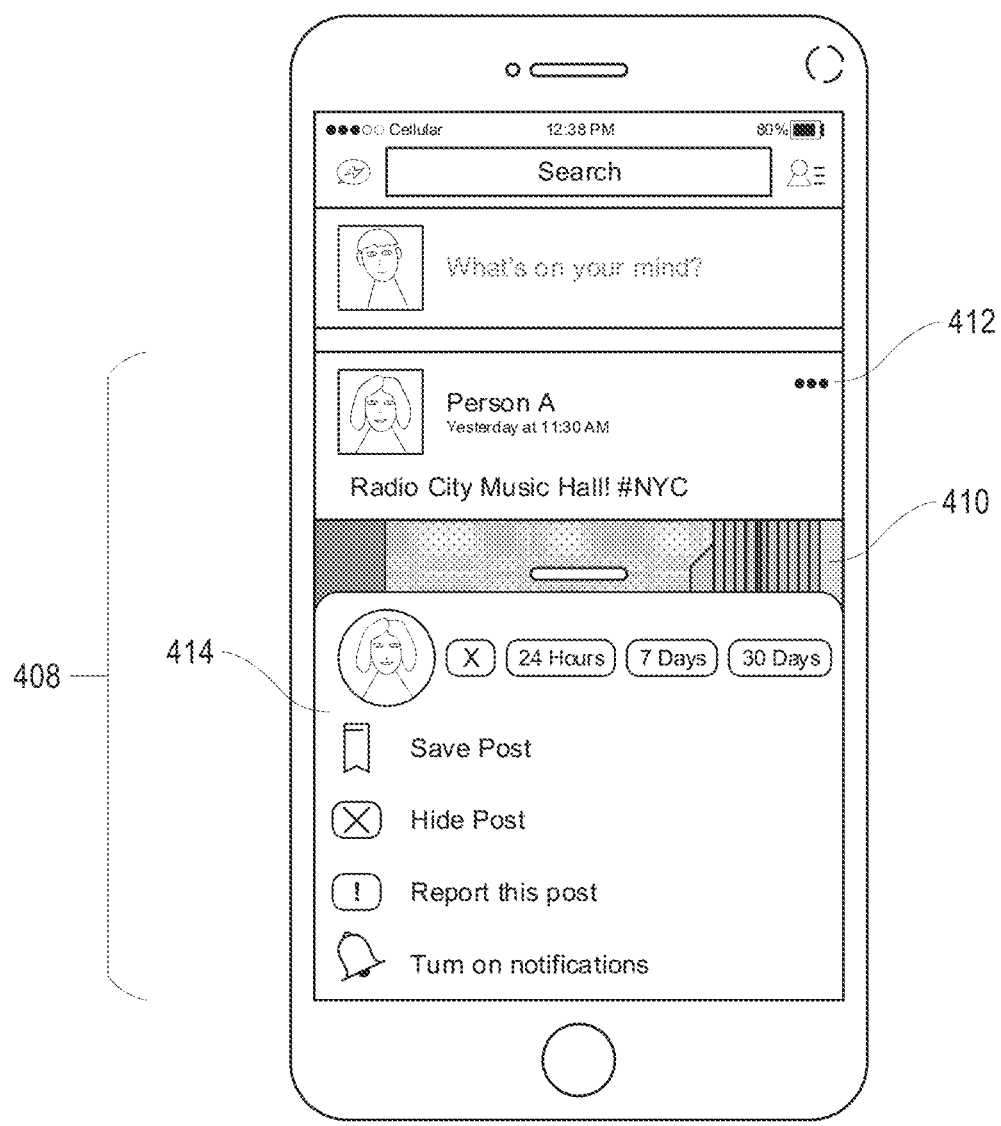

FIGS. 4A-4C illustrate an example scenario 400 according to an embodiment of the present disclosure. In this example, an interface 404 is presented through a display screen of a computing device 402. The interface 404 may be provided through an application (e.g., a web browser, a social networking application, messenger application, etc.) running on the computing device 402 that is configured to interact with a social networking system. As shown in FIG. 4A, the interface 404 may have a field 406 through which a user operating the computing device 402 can post content to the social networking system. The interface 404 may also provide a content feed 408 through which the user can view and interact with content items posted by other users of the social networking system. In FIG. 4A, the content feed 408 includes a content item (or post) 410 that was posted by another user "Person A". In various embodiments, the user can temporarily prevent content items posted by the user "Person A". For example, the use can select an option 412 to access a set of options as illustrated in the example of FIG. 4B. The options can be provided in a menu 414. In some embodiments, the menu 414 can include an option 416 to temporarily prevent content items posted by the user "Person A" from being included in the user's content feed 408 for a specified (or predefined) amount of time. When the option 416 is selected, the menu 414 can provide options that correspond to predefined time periods (e.g., 24 hours, 7 days, 30 days, etc.) as illustrated in the example of FIG. 4C. The user can select one of these time periods to temporarily prevent content items posted by the user "Person A" from being included in the user's content feed 408 for the selected time period.

Figure 4D:
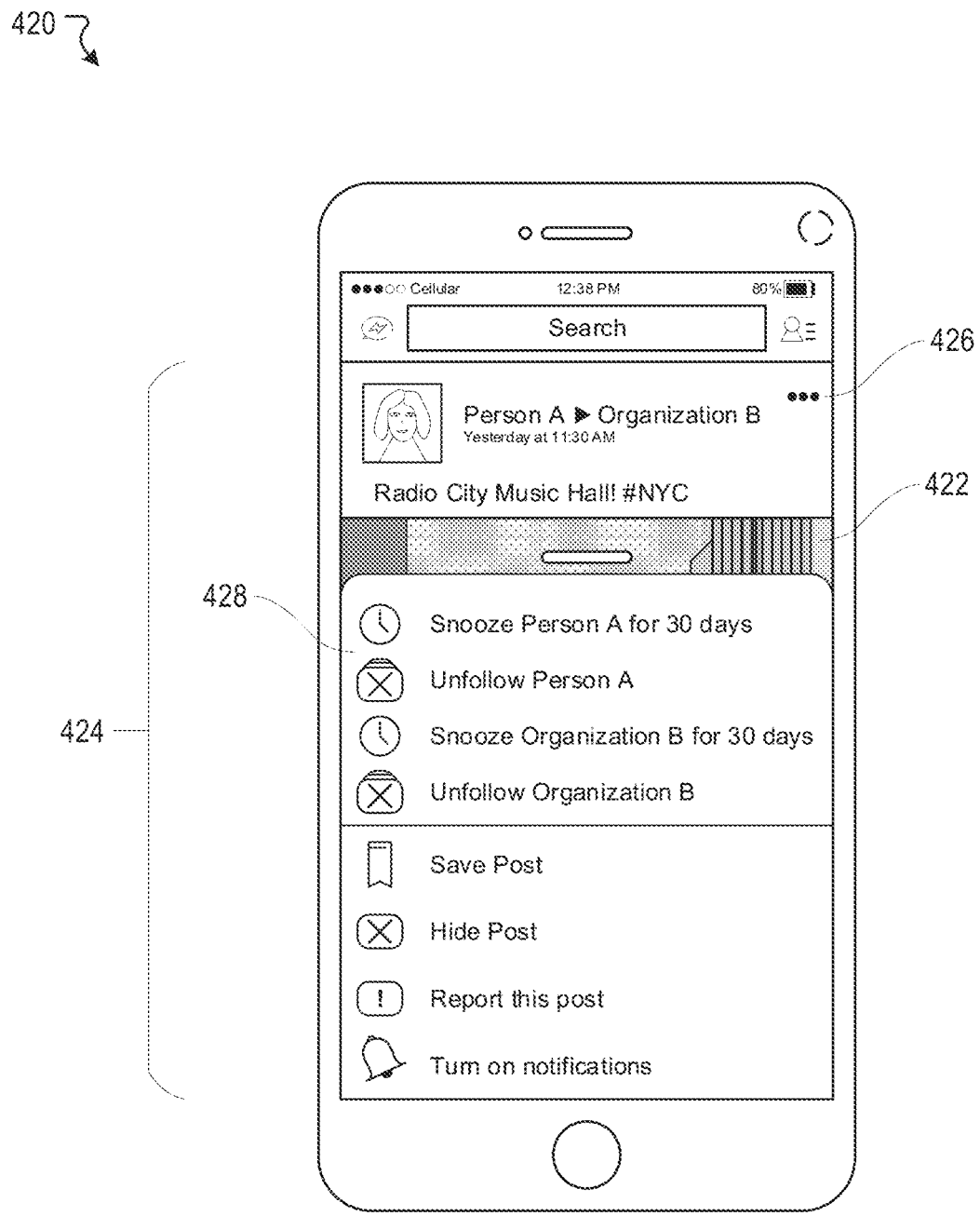

FIG. 4D illustrates another example scenario 420, according to an embodiment of the present disclosure. In this example scenario 420, a content item (or post) 422 posted by a user "Person A" was originally posted to a group associated with an entity (e.g., "Organization B"). The content item 422 can appear in a user's content feed 424, for example, because the user likes (or subscribes to) the group. In this example, the user can select an option 426 to access a menu 428. The menu 428 can provide options for temporarily preventing (or muting) posts originating from the user "Person A" and/or the group associated with the entity "Organization B" from appearing in the user's content feed 424 for a specified (or predetermined) duration of time.

Figure 4E:
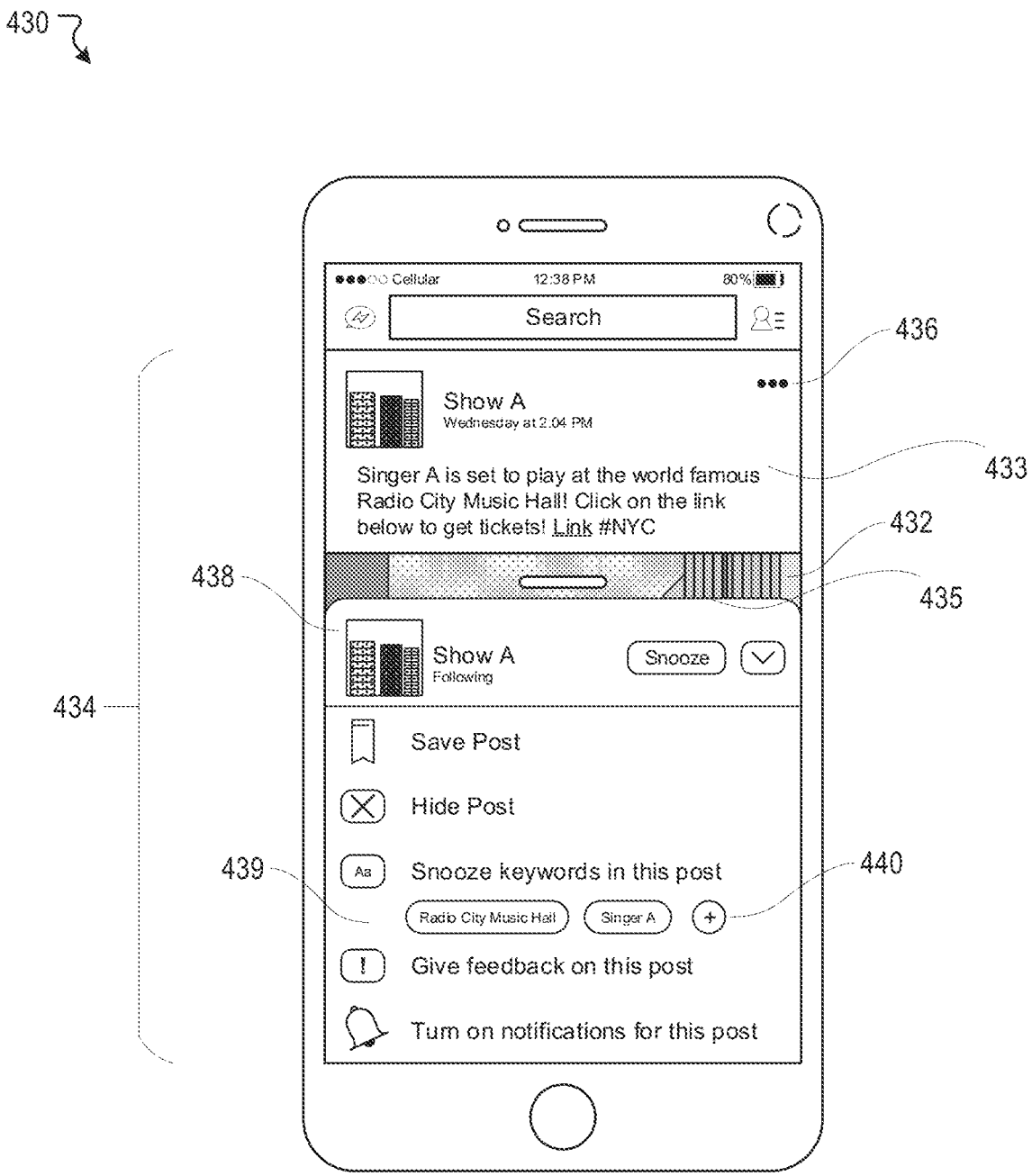
Figure 4F:
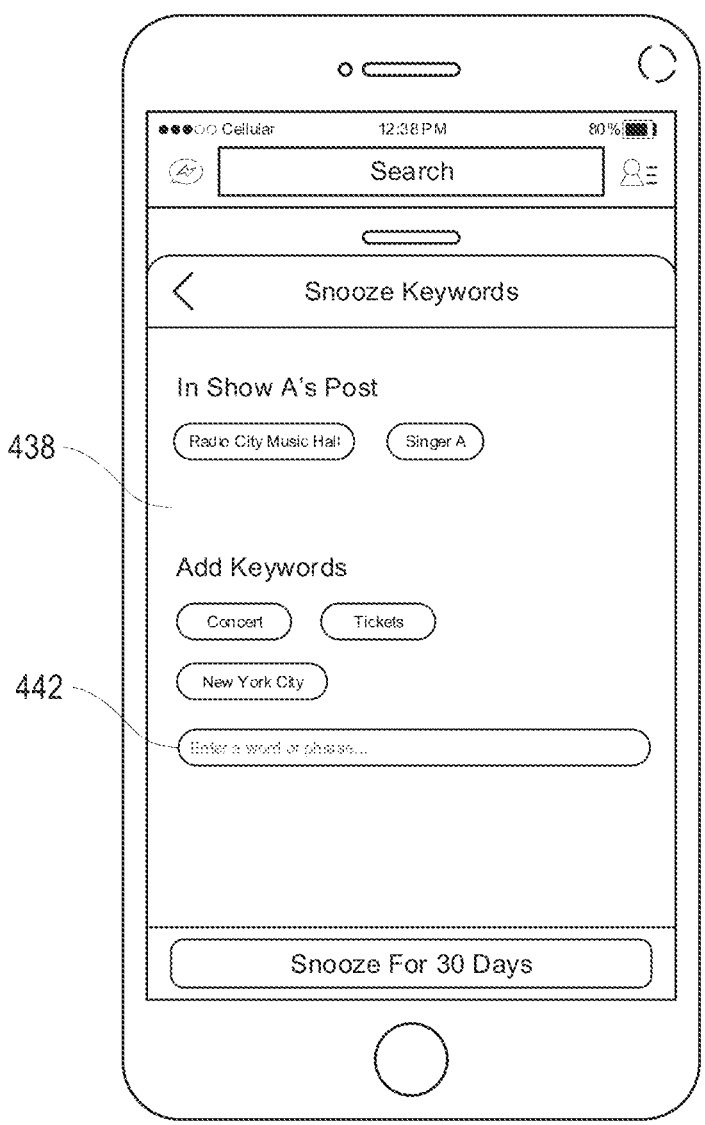

FIGS. 4E-4F illustrate another example scenario 430, according to an embodiment of the present disclosure. As shown in FIG. 4E, a content item (or post) 432 posted to page associated with an entity (e.g., "Show A") appears in a content feed 434 of a user. The content item 432 includes text 433 ("Singer A is set to play at the world famous Radio City Music Hall! Click on the link below to get tickets! Link #NYC") and an image 435. In this example, the user can select an option 436 to access a menu 438. The menu 438 can provide options for temporarily preventing (or muting) posts originating from the page associated with the entity "Show A" from appearing in the user's content feed 434 for a specified (or predetermined) duration of time. In some embodiments, the menu 438 provides options for temporarily preventing posts associated with certain keywords from appearing in the content feed 434 for a specified (or predetermined) period of time. In such embodiments, the menu 438 can provide a list of suggested keywords 439 that were determined for the post 432. In various embodiments, keywords selected by the user are then used to determine whether to include a given content item in the user's content feed 434. For instance, if the user selects a keyword "#NYC", then content items associated with the keyword "#NYC" will not be included in the user's content feed 434. In some embodiments, an option 440 can be selected to add custom keywords to be muted. When the option 440 is selected, the menu 438 can provide additional suggested keywords that can be selected to temporarily mute content items from the content feed 434 as illustrated in the example of FIG. 4F. The menu 438 can also provide a region 442 through which the user can enter specific keywords to be muted temporarily.

Figure 4G:
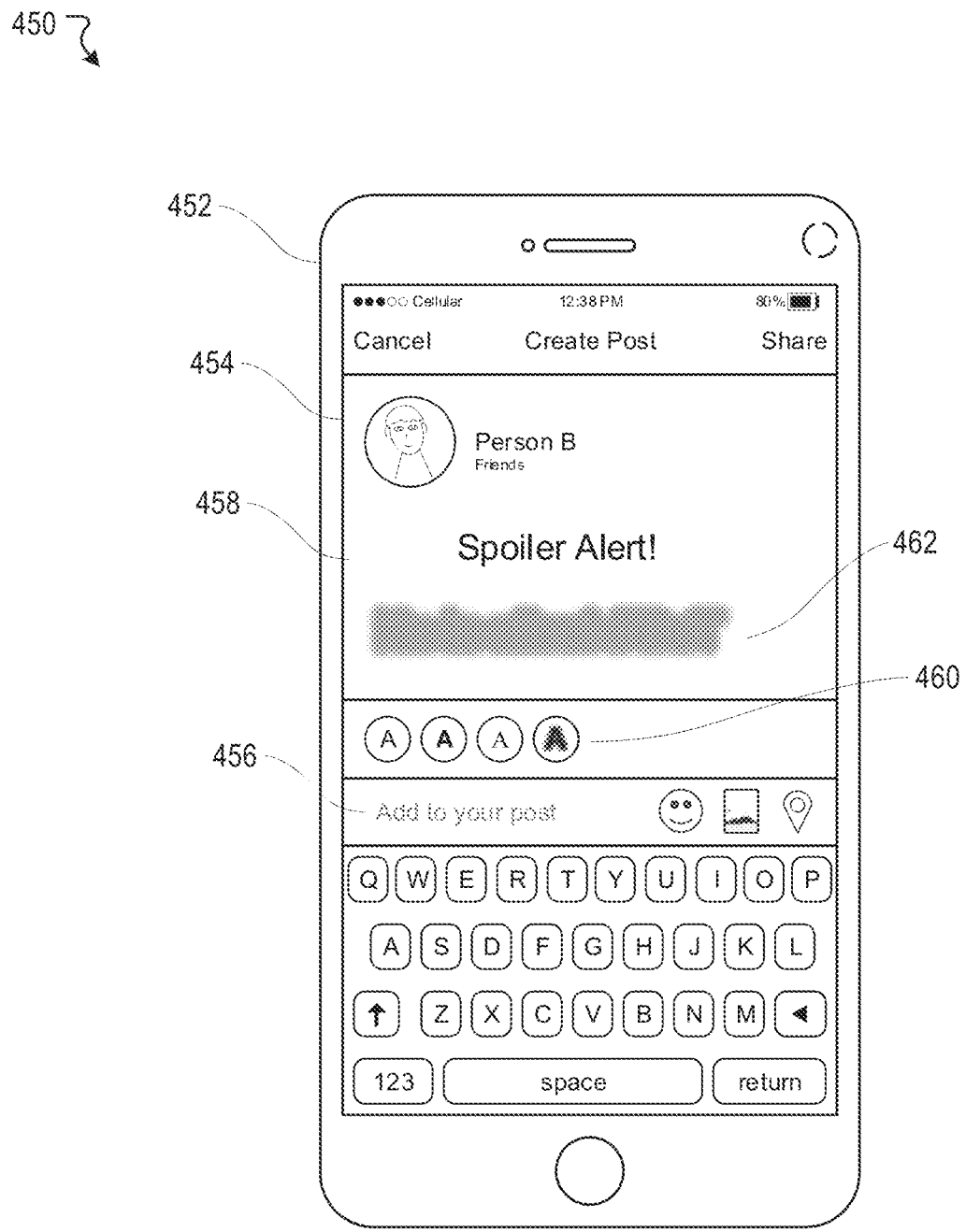
Figure 4H:
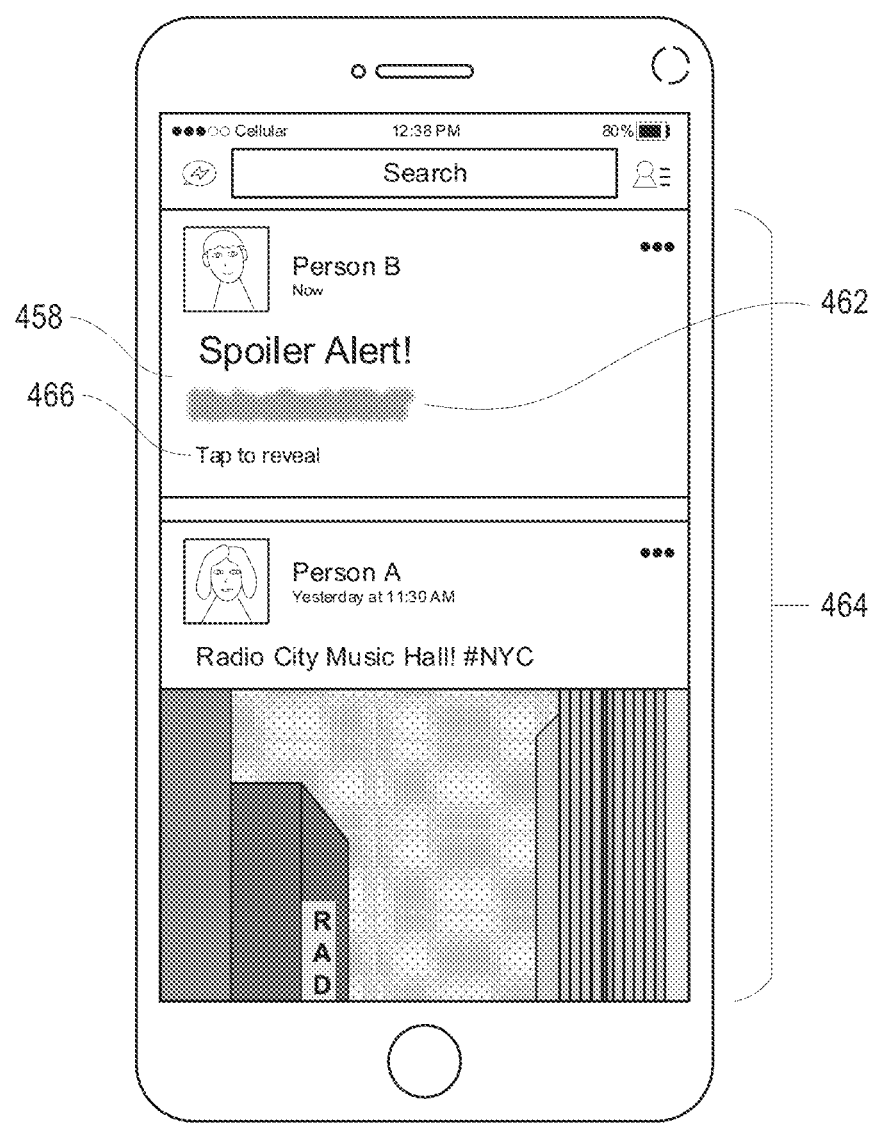
Figure 4I:
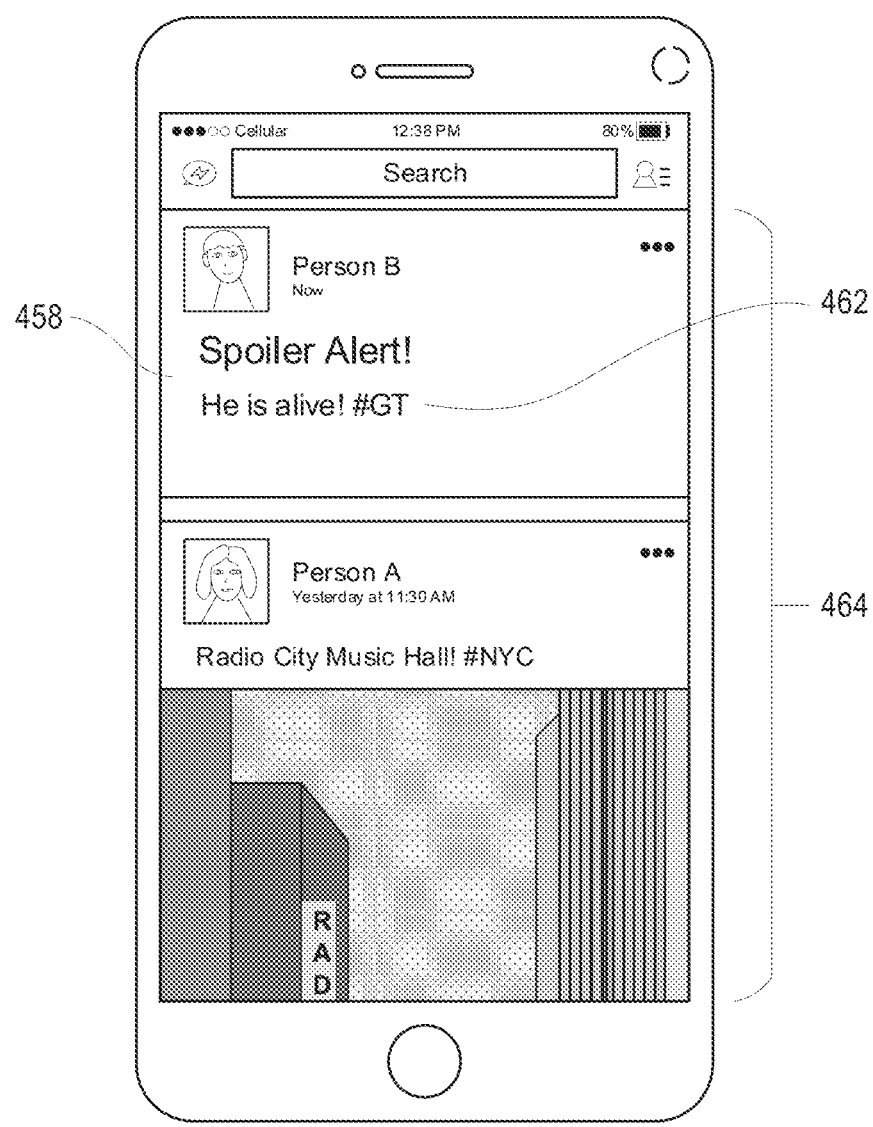

FIGS. 4G-4I illustrate another example scenario 450, according to an embodiment of the present disclosure. In this example, an input interface 454 is presented through a display screen of a computing device 452. Further, the input interface 454 may be provided through an application (e.g., a web browser, a social networking application, messenger application, etc.) running on the computing device 452 that is configured to interact with a social networking system. As shown in FIG. 4G, the input interface 454 can have a region 456 through which a user operating the computing device 452 can post one or more content items to the social networking system. In the example of FIG. 4G, the user can select an option 460 to obfuscate portions of a post (or content item) 458 being posted to the social networking system. In this example, a portion 462 of the post 458 has been obfuscated because it contains a spoiler. In some embodiments, a message (e.g., "Spoiler Alert!") providing a reason for obfuscating the portion 462 can also be provided. As shown in the example of FIG. 4H, once posted, the obfuscated post 458 can be included in a content feed 464 of some user of the social networking system. In this example, the content feed 464 may provide an option 466 to reveal the obfuscated portion 462 of the post 458. When the option 466 is selected, the obfuscated portion 462 can be revealed as shown in the example of FIG. 4I.

FIG. 5A illustrates an example method, according to an embodiment of the present disclosure. It should be appreciated that there can be additional, fewer, or alternative steps performed in similar or alternative orders, or in parallel, within the scope of the various embodiments discussed herein unless otherwise stated.

At block 502, a content feed comprising content items associated with a plurality of entities to be presented through a display screen of a computing device is provided. At block 504, a selection of an option to temporarily prevent content items satisfying at least one criterion from appearing in the content feed for a duration of time is determined. At block 506, at least one content item that satisfies the at least one criterion is removed from the content feed.

Figure 5B:
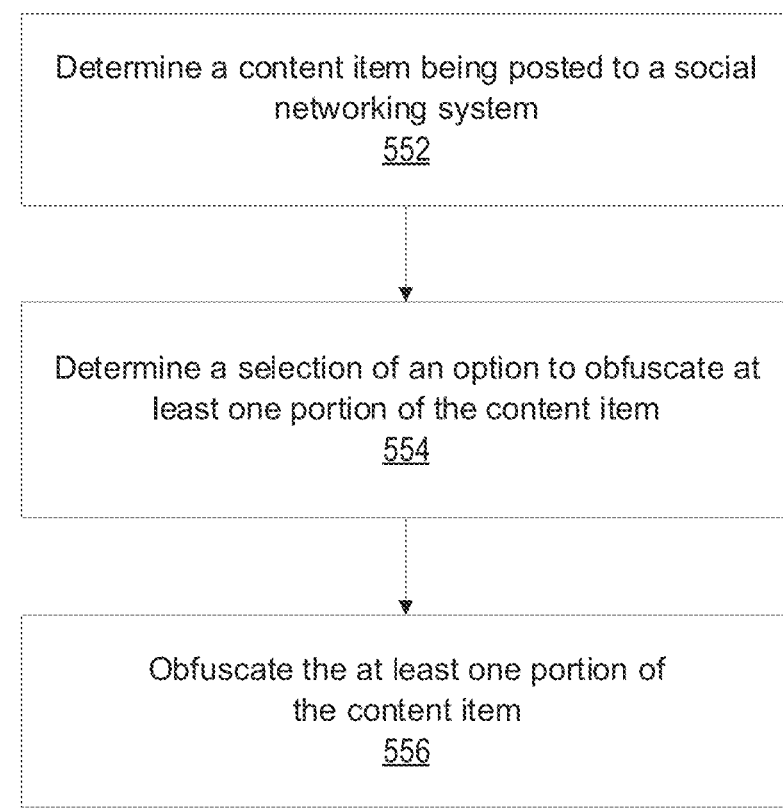
FIG. 5B illustrates another example method, according to an embodiment of the present disclosure.

FIG. 5B illustrates another example method, according to an embodiment of the present disclosure. It should be appreciated that there can be additional, fewer, or alternative steps performed in similar or alternative orders, or in parallel, within the scope of the various embodiments discussed herein unless otherwise stated.

At block 552, a content item being posted to a social networking system is determined. At block 554, a selection of an option to obfuscate at least one portion of the content item is determined. At block 556, the at least one portion of the content item is obfuscated.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
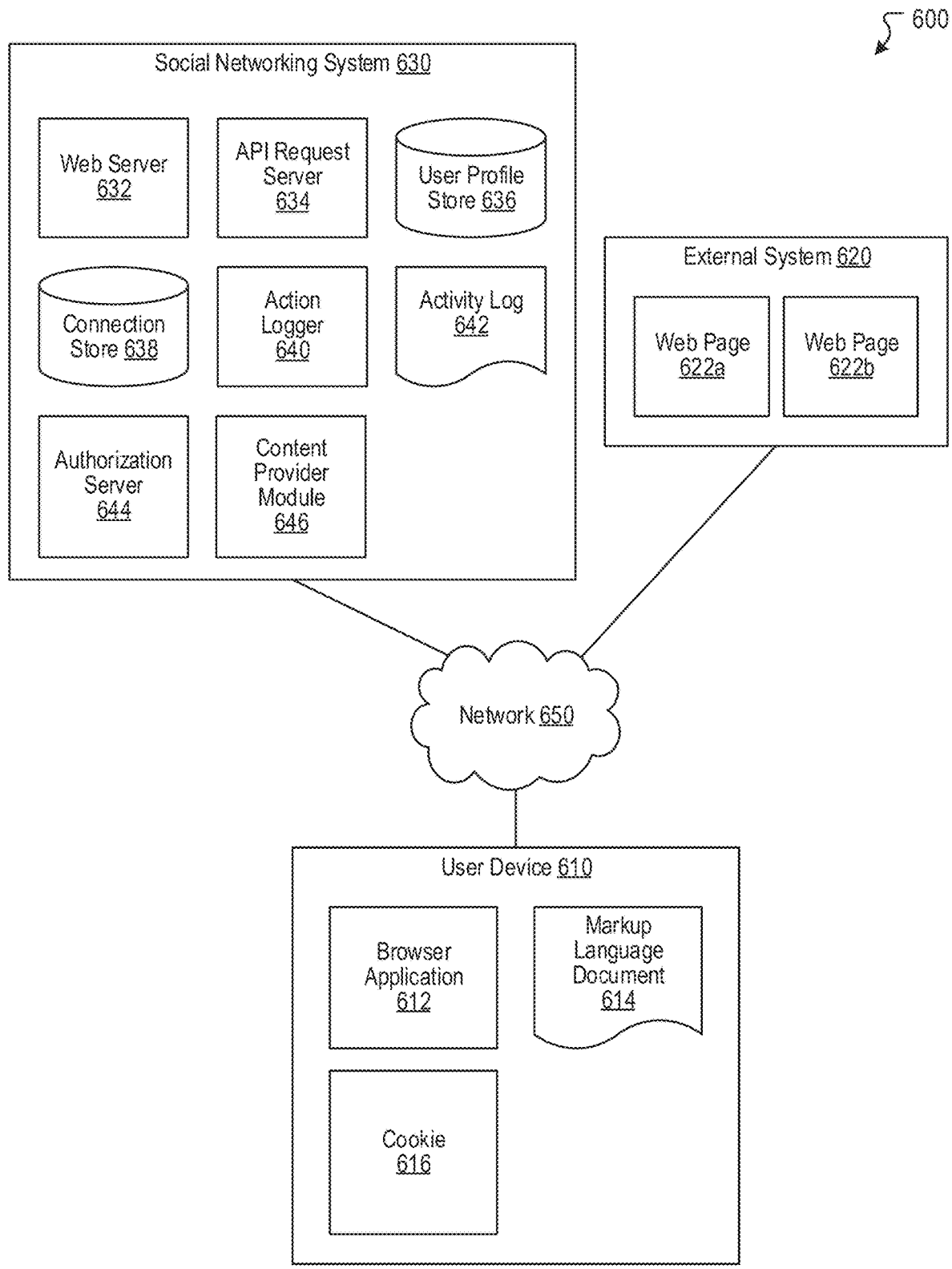
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, a content provider module 646 can be implemented in the social networking system 630. The content provider module 646 can, for example, be implemented as the content provider module 102 of FIG. 1 in whole or in part. In some embodiments, various functionality performed by the content provider module 102 can also be implemented in the user device 610. As discussed previously, it should be appreciated that there can be many variations or other possibilities.

Hardware Implementation

Figure 7:
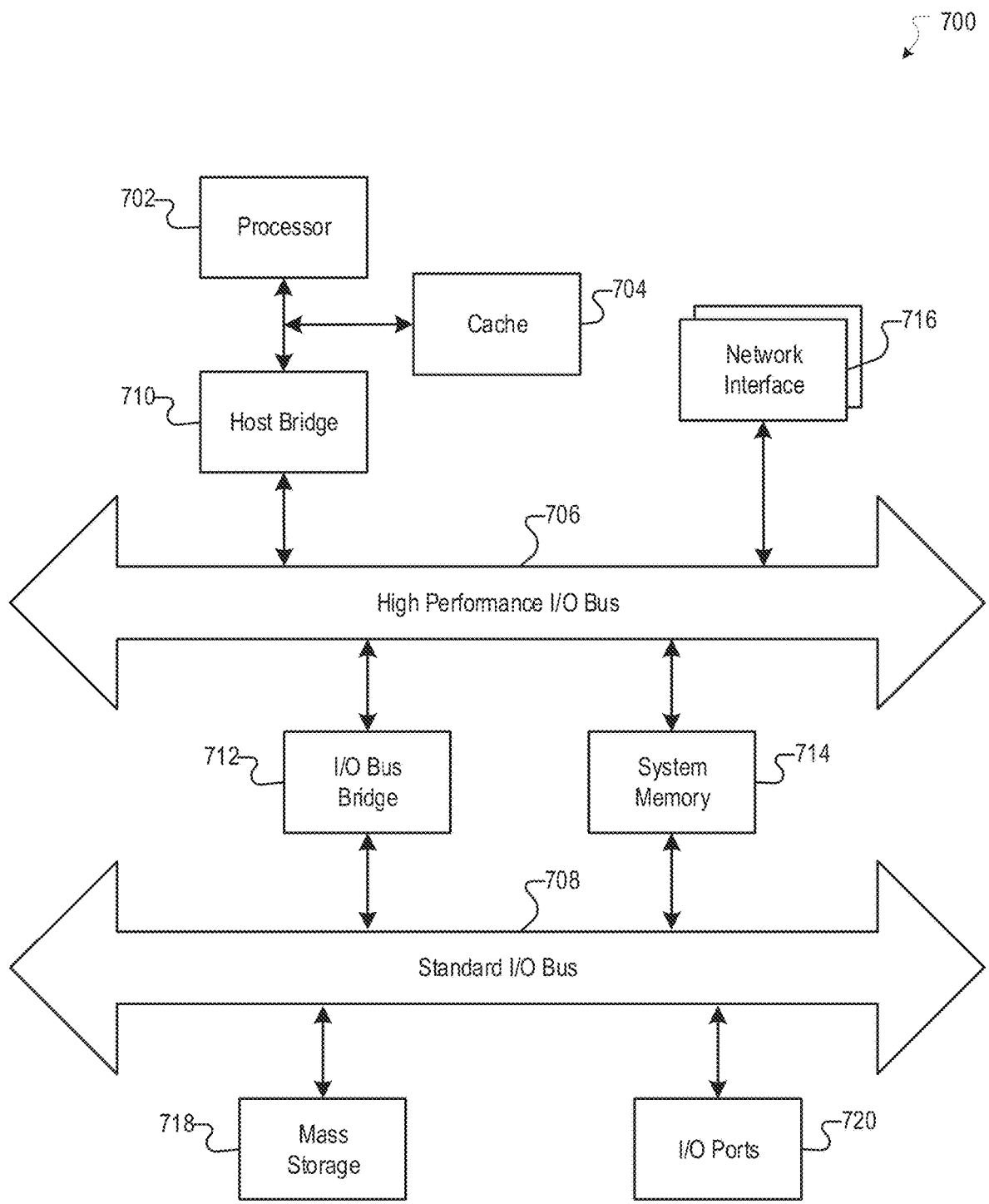
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    determining, by a computing system, a content item being posted to a system;
    determining, by the computing system, at least one portion of the content item to be obfuscated;
    generating, by the computing system, a message, wherein the message includes a reason for obfuscating the at least one portion of the content item;
    obfuscating, by the computing system, the at least one portion of the content item; and
    providing, by the computing system, the content item for publication in a content feed, wherein the content item is published in the content feed with the at least one obfuscated portion, and wherein the generated message including the reason for obfuscating the at least one portion of the content item is not obfuscated.

2. The computer-implemented method of claim 1, wherein the at least one portion of the content item is visually obscured to prevent users of the system from unintentionally viewing the at least one portion of the content item.

3. The computer-implemented method of claim 2, wherein the at least one portion of the content item corresponds to text associated with the content item, and wherein the text is visually obscured.

4. The computer-implemented method of claim 2, wherein the at least one portion of the content item corresponds to an image associated with the content item, and wherein the image is visually obscured.

5. The computer-implemented method of claim 2, wherein the at least one portion of the content item corresponds to at least one frame of a video associated with the content item, and wherein the at least one frame is visually obscured.

6. The computer-implemented method of claim 1, wherein the content item is associated with an option that can be selected to reveal the at least one obfuscated portion of the content item.

7. The computer-implemented method of claim 1, the method further comprising:
    determining, by the computing system, at least one second portion of the content item to be obfuscated based at least in part on a machine learning model; and
    obfuscating, by the computing system, the at least one second portion of the content item.

8. The computer-implemented method of claim 7, the method further comprising:
    generating, by the computing system, a second message to be included with the content item, wherein the second message includes a reason for obfuscating the at least one second portion of the content item.

9. A system comprising:
    at least on processor; and
    a memory storing instructions that, when executed by the at least one processor, cause the system to perform:
    determining a content item being posted to a system;
    determining at least one portion of the content item to be obfuscated;
    generating a message, wherein the message includes a reason for obfuscating the at least one portion of the content item;
    obfuscating the at least one portion of the content item; and
    providing the content item for publication in a content feed, wherein the content item is published in the content feed with the at least one obfuscated portion, and wherein the generated message including the reason for obfuscating the at least one portion of the content item is not obfuscated.

10. The system of claim 9, wherein the at least one portion of the content item is visually obscured to prevent users of the system from unintentionally viewing the at least one portion of the content item.

11. The system of claim 10, wherein the at least one portion of the content item corresponds to text associated with the content item, and wherein the text is visually obscured.

12. The system of claim 10, wherein the at least one portion of the content item corresponds to an image associated with the content item, and wherein the image is visually obscured.

13. The system of claim 10, wherein the at least one portion of the content item corresponds to at least one frame of a video associated with the content item, and wherein the at least one frame is visually obscured.

14. A non-transitory computer-readable storage medium including instructions that, when executed by at least one processor of a computing system, cause the computing system to perform a method comprising:
    determining a content item being posted to a system;
    determining at least one portion of the content item to be obfuscated;

generating a message, wherein the message includes a reason for obfuscating the at least one portion of the content item;

obfuscating the at least one portion of the content item; and providing the content item for publication in a content feed, wherein the content item is published in the content feed with the at least one obfuscated portion, and wherein the generated message including the reason for obfuscating the at least one portion of the content item is not obfuscated.

15. The non-transitory computer readable storage medium of claim 14, wherein the at least one portion of the content item is visually obscured to prevent users of the system from unintentionally viewing the at least one portion of the content item.

16. The non-transitory computer readable storage medium of claim 15, wherein the at least one portion of the content item corresponds to text associated with the content item, and wherein the text is visually obscured.

17. The non-transitory computer readable storage medium of claim 15, wherein the at least one portion of the content item corresponds to an image associated with the content item, and wherein the image is visually obscured.

18. The non-transitory computer readable storage medium of claim 15, wherein the at least one portion of the content item corresponds to at least one frame of a video associated with the content item, and wherein the at least one frame is visually obscured.

19. The system of claim 9, the method further comprising:
determining at least one second portion of the content item to be obfuscated based at least in part on a machine learning model; and
obfuscating the at least one second portion of the content item.

20. The non-transitory computer-readable storage medium of claim 14, the method further comprising:
determining at least one second portion of the content item to be obfuscated based at least in part on a machine learning model; and
obfuscating the at least one second portion of the content item.

* * * * *